A. M. AYERS.
BEARING FOR ROLLERS.
APPLICATION FILED APR. 7, 1920.

1,385,418.

Patented July 26, 1921.

INVENTOR
Albert M. Ayers.
BY
ATTORNEY

UNITED STATES PATENT OFFICE.

ALBERT M. AYERS, OF NUTLEY, NEW JERSEY.

BEARING FOR ROLLERS.

1,385,418.  Specification of Letters Patent.  Patented July 26, 1921.

Application filed April 7, 1920. Serial No. 371,847.

*To all whom it may concern:*

Be it known that I, ALBERT M. AYERS, a citizen of the United States, residing at Nutley, in the county of Essex and State of New Jersey, have invented certain new and useful Improvements in Bearings for Rollers, of which the following is a specification, reference being had therein to the accompanying drawing.

My invention relates to improvements in bearings for rollers and similar devices, and more particularly has reference to and is illustrated in the accompanying drawings in its application to a roller such as may be used in connection with a duplicating machine, shade, or similar devices.

Figure 1:
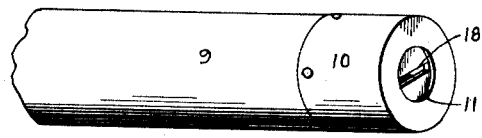
Figure 2:
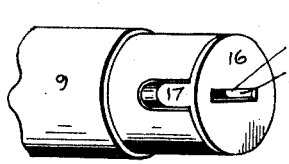
Figure 3:
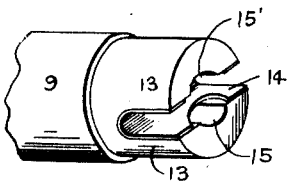
Figure 4:
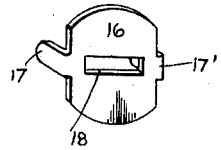

In said drawings, Figure 1 is a view in perspective, partly broken away illustrating one end of a roller embodying an application of my invention. Figs. 2, 3 and 7 are enlarged perspective details partly broken away and with parts omitted illustrating modifications. Fig. 4 is a perspective detail of one of the interfitting parts of the bearing, and Figs. 5, 6 and 8 are similar views illustrating modifications thereof.

9 indicates the solid end of the roller or stick which may be finished off with a suitable metallic cap such as 10 having a cut-away portion or hole 11 to provide clearance for the male portion of the bearing which forms no part of this invention. The end of the stick or roller with which we have to do is kerfed forming two lugs or forked ends 13, 13 between which the U-shaped liner 14, shown to better advantage in Fig. 5, may be introduced as shown in Fig. 3, where it will be seen that the insides of the lugs or forked members may be cut-away as indicated at 15, 15' to provide additional clearance for some forms of male members of larger cross-section than others. Referring now more particularly to Fig. 2, it will be observed that the engaging member shown to better advantage in Fig. 4 is provided with a face 16 and depending lugs 17, 17', said lugs being adapted to engage between the sides of the liner 14 as shown to better advantage in Fig. 2 so that when the slot 18 in the face 16 is engaged by the male member of the bearing, the twist imparted to the member shown in Fig. 4 is transmitted through the face, the lugs 17, 17' and liner 14 to the forked ends 13, 13 of the roller which are retained within the cap 10, thus forming a compact, strong, simple, durable, and economic construction.

Figure 6:
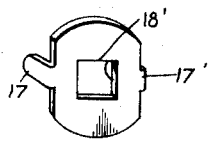
Figure 7:
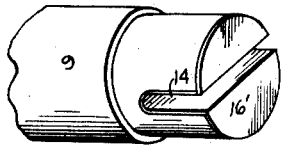

In the modification shown in Fig. 6, the hole 18' is shown square instead of elongated for different forms of male members in which case the forked ends 13, 13 of the roller would preferably be cut-away as shown at 15, 15'.

Figure 5:
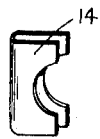
Figure 8:
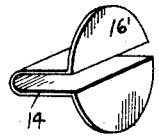

Referring now more particularly to Figs. 7 and 8, it will be observed that instead of using a liner such as shown in Fig. 5, one of the forms shown in Fig. 8 may be employed in which the face 16' is formed integrally with the liner 14 and may be applied as shown in Fig. 7, and of course the same may be cut away as indicated at 15—15' for larger male parts as before referred to.

Of course it will be understood that various modifications may be made in the construction and arrangement of parts without departing from the spirit of the invention as claimed.

I claim:—

1. In combination with a roller having a kerfed end, a liner and facing therefor, said facing open to receive an interlocking male part, and a cap adapted to partly cover said end of said roller and liner.

2. In combination with a roller having a kerfed end, a liner and facing therefor, said facing open to receive an interlocking male part, and a cap adapted to partly cover said end of said roller and liner, and in combination therewith an engaging member between said liner and said housing through which the male engaging member projects.

3. In combination with a roller having a kerfed end, a liner and facing therefor, said facing open to receive an interlocking male part, and a cap adapted to partly cover said end of said roller and liner, and said liner and facing formed integrally out of a single piece of metal.

In testimony whereof I hereunto affix my signature.

ALBERT M. AYERS.